3,023,082
PROCESS FOR THE PRODUCTION OF CALCIUM-MONOFLUORIDE

Dieter Goerrig, Lohmar, and Viktor Lwowski, Leverkusen-Bayerwerk, Germany (both % Farbenfabriken Bayer A.G., Leverkusen-Bayerwerk, Germany); said Lwowski assignor to said Goerrig
No Drawing. Filed May 8, 1958, Ser. No. 733,812
Claims priority, application Germany May 10, 1957
5 Claims. (Cl. 23—88)

The present invention relates to a process for the production of calcium monofluoride.

Calcium monofluoride has already been detected in activated $CaF_2$ vapour by spectroscopy. Its thermodynamic constants have been calculated on the basis leading to the conclusion that CaF formed at an elevated temperature disproportionates upon cooling into calcium metal and calcium fluoride according to the equation $$2CaF \rightarrow Ca + CaF_2$$

Observations regarding the action of Ca on $CaF_2$ have led to similar assumptions and to analogous conclusions regarding the Ca—$CaCl_2$ system. A process for the production of large scale quantities of CaF or at least of quantities sufficient for the study of its properties has hitherto not been described.

In accordance with the invention it has been found that calcium monofluoride can be produced by heating a mixture of calcium hydride and calcium fluoride to temperatures of above 700° C.

The new process not only enables quantities of CaF to be produced on a large scale in a simple manner, but also yields a product having a surprising stability to disproportionation, as well as to oxidation by air at temperatures varying from room temperature to 1500° C., and to hydrolysis by water.

The reaction proceeds according to the following equation $$CaH_2 + CaF_2 \rightarrow 2CaF + H_2$$

The resultant monofluoride does not disproportionate under the cooling conditions commonly applied in industry so that it can be isolated as reaction product.

The splitting off of hydrogen from the reaction mixture depends not only on the temperature but also on the hydrogen pressure in the gaseous phase. The observation is interesting that the $H_2$ pressure is substantially higher above a mixture of $CaH_2$ and $CaF_2$ than above $CaH_2$ alone because it shows that the formation of monofluoride does not proceed via Ca primarily formed from $CaH_2$.

Apart from the hydrogen pressure, a minimum temperature is required in practice in order to carry out the reaction according to the invention within a technically satisfactory period of time which depends on the particle size of the components and on the homogeneity of the mixture. For example, for a particle size of 0.1 millimetre, a minimum reaction temperature of about 700° C. is required, the reaction being completed in about one hour.

When the reaction is carried out at a higher temperature, for example at 1000° C., it proceeds essentially more rapidly even with coarser material and at this temperature the reaction product starts to sinter.

With pure starting materials the reaction mass melts at 1200° C. to give a clear solution but with technical starting materials the melting point is depressed by impurities.

The monofluoride formed by the reaction need not be chilled by special methods in order to be prevented from disproportionating. It is sufficient to carry out the chilling so rapidly that the temperature drops from 1000 to 500° C. in less than one hour.

It has further been found that the tendency to disproportionation upon cooling can be reduced by additives which are soluble in the monofluoride. Thus, especially stable products are obtainable by heating calcium hydride and calcium fluoride containing 3–30 percent of CaO and/or 1–20 percent of $CaC_2$ (referred to CaF) to temperatures above 700° C. For example, an 85% CaF containing about 10 percent of CaO and about 5 percent of $CaC_2$ may be cooled so slowly that the temperature drops from 1000 to 500° C. only within five hours without involving a disproportionation into Ca and $CaF_2$.

It has, therefore, been found advantageous in technical production to start from a calcium hydride containing about 10 to 30 percent of CaO and 1 to 15 percent of $CaC_2$, and to use about 98% fluorspar since there are difficulties to be met in rapidly cooling bulky mixtures.

It is a matter of course that melted CaF reacts more slowly than sintered CaF; but it is surprising that all preparations show a great stability of the material in comparison to Ca, $CaH_2$ or $CaC_2$. As may be seen from one of the following examples, the stability of the monofluoride permits the melting process to be carried out at temperatures of 1200° C. and more even when exposed to air; the stability to hydrolysis permits the chilling of the hot solidified melt even with liquid water.

Moreover, the calcium monofluoride is an extremely strong reducing agent which can be used, for example, for deoxidation and desulphurization of metal melts.

The following examples are given for the purpose of illustrating the invention.

Example 1

84 grams (2 mol) of 99.9% $CaH_2$ and 156 grams (2 mol) of 99% $CaF_2$, both having a particle size of 0.1 millimetre or less, are intimately mixed by shaking. The mixture is heated in a steel tube under normal hydrogen pressure to 1000° C. whereby the liberated hydrogen escapes. At 1000° C., the pressure is reduced to about 1 mm. Hg. The mixture is kept at 1000° C. for half an hour and subsequently cooled to about 100° C. within one hour by removing the tube from the furnace. After dismantling, there is obtained a sintered block consisting of a brittle dark grey, homogeneous mass which reacts slowly with water and contains according to analysis 66.6 percent of Ca and 31.8 percent of F, i.e. about a 98% CaF. The hydrogen content is less than 0.02 percent.

Example 2

A mixture is prepared of 20 kilograms of a technical calcium hydride with 71.2 percent of $CaH_2$, 20.4 percent of CaO and 4.1 percent of $CaC_2$ (particle size less than 1 millimetre) and 26 kilograms of a 98% $CaF_2$ (particle size less than 1 millimetre). This mixture is introduced in small portions into a graphite crucible (capacity of about 4 litres) pre-heated to 1500° C., each new addition being made when the contents is melted clear. When the crucible is filled to about two-thirds, the melt (temperature between 1170 to 1200° C.) is chilled and can be solidified while exposed to air. Fresh material is immediately introduced into the hot crucible. In this way, the mixture of 46 kilograms is worked up within about 5 hours and a brittle dark grey, homogeneous melt containing 84.3 percent of CaF is thus obtained.

We claim:
1. Process for the production of calcium monofluoride which comprises heating a mixture of calcium hydride and calcium fluoride to a temperature between about 700 and 1500° C. in the presence of a member selected from the group consisting of CaO, $CaC_2$ and mixtures thereof, said group member being present in amount sufficient to produce a content thereof in the formed calcium mono- fluoride of 3 to 30% in the case of CaO, and 1 to 20% in the case of $CaC_2$.

2. Process for the production of stable calcium monofluoride which comprises heating a mixture of calcium hydride and calcium fluoride, said calcium hydride containing about 10 to 30% of CaO, to a temperature of between about 700 and 1500° C.

3. Process for the production of stable calcium monofluoride which comprises heating a mixture of calcium hydride and calcium fluoride, said calcium hydride containing about 1 to 15% of $CaC_2$, to a temperature of between about 700 and 1500° C.

4. Process for the production of stable calcium monofluoride which comprises heating a mixture of calcium hydride and calcium fluoride, said calcium hydride containing about 10 to 30% of CaO and about 1 to 15% of $CaC_2$, to a temperature of between about 700 and about 1500° C.

5. Process according to claim 4 wherein said calcium hydride contains 20.4% of CaO and 4.1% of $CaC_2$.

References Cited in the file of this patent

UNITED STATES PATENTS 2,770,526    Lander _____ Nov. 13, 1956

OTHER REFERENCES

Friend: "Textbook on Inorganic Chemistry," vol. III, part I, pages 24 and 25 (1925).

Perkin and Pratt: "Transactions of the Faraday Society" (London), vol. 3, part 3, pages 179–186 (March 1908).

Hurd: "Chemistry of the Hydrides," pages 41–43 (1952), John Wiley and Sons, New York, N.Y.